(12) United States Patent
Kaneta et al.

(10) Patent No.: US 7,880,985 B2
(45) Date of Patent: Feb. 1, 2011

(54) LENS BARREL

(75) Inventors: Takahiro Kaneta, Hino (JP); Tatsuo Takanashi, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 114 days.

(21) Appl. No.: 12/419,857

(22) Filed: Apr. 7, 2009

(65) Prior Publication Data

US 2009/0262441 A1    Oct. 22, 2009

(30) Foreign Application Priority Data

Apr. 16, 2008  (JP)  ............................. 2008-106330
Jan. 29, 2009  (JP)  ............................. 2009-018483

(51) Int. Cl.
G02B 7/02    (2006.01)

(52) U.S. Cl. ...................................... 359/826

(58) Field of Classification Search ................. 359/425, 359/704, 826, 829

See application file for complete search history.

(56) References Cited

U.S. PATENT DOCUMENTS 4,763,987 A * 8/1988 Ando ........................ 359/826

FOREIGN PATENT DOCUMENTS

JP         2004-191434         7/2004

* cited by examiner

*Primary Examiner*—Joseph Martinez
(74) *Attorney, Agent, or Firm*—Straub & Pokotylo; John C. Pokotylo

(57) ABSTRACT

A lens barrel includes a first member which has a first sliding-contact surface and an opening formed in the first sliding-contact surface; a second member which has a second sliding-contact surface and moves relative to the first member, the second sliding-contact surface being placed in sliding contact with the first sliding-contact surface; a photodetector provided in the opening of the first member, facing the second sliding-contact surface, to detect relative movement between the first member and the second member; and a lubricant sump portion which, being provided in the first member, has a lubricant sump space on opposite sides of the opening interposing the opening therebetween in a direction of the relative movement.

22 Claims, 10 Drawing Sheets

LENS BARREL

CROSS REFERENCE TO RELATED APPLICATION

This application claims the benefit of Japanese Applications No. 2008-106330 filed in Japan on Apr. 16, 2008, and No. 2009-018483 filed in Japan on Jan. 29, 2009, the contents of which are incorporated herein by this reference.

BACKGROUND OF THE INVENTION

1. Field of the Invention

The present invention relates to a lens barrel, and more particularly, to a lens barrel equipped with a mobile-object detection apparatus which detects relative movement between two members such as a fixed frame and rotary frame.

2. Description of the Related Art

Conventionally, a lens barrel or the like which includes multiple frame members incorporates a mobile-object detection apparatus which detects relative movement between two members.

Frame members which make up a typical lens barrel includes, for example, a fixed frame fastened to a fixed part or the like of a camera body, a rotary frame housed in the fixed frame in such a way as to be able to rotate relative to the fixed frame and move relative to the fixed frame along an optical axis, plural lens frames housed in the rotary frame in such a way as to be able to move along the optical axis, but with rotation relative to the rotary frame restricted.

The plural lens frames hold lens groups each of which contains one or more lenses. During a zoom operation, as the rotary frame is rotated in the fixed frame, the lens frames in the rotary frame advance or retreat along the optical axis along with the rotation of the rotary frame, thereby placed at predetermined zoom positions on the optical axis.

During an autofocusing operation, out of the lens frames in the rotary frame, a focusing lens frame which holds a focusing lens group advances and retreats along the optical axis, thereby performing a focusing operation.

Some conventional lens barrels configured as described above are equipped with a mobile-object detection apparatus which detects relative movement between two members, such as a fixed frame and rotary frame, which move relative to each other. Such a mobile-object detection apparatus is generally equipped with a photodetector such as a photoreflector (photosensor).

The conventional lens barrel is designed such that the rotary frame advances and retreats along the optical axis, rotating in the fixed frame. By detecting an amount of rotation of the rotary frame, it is possible to detect an amount of movement of the rotary frame relative to the fixed frame.

Thus, the mobile-object detection apparatus of the conventional lens barrel detects an amount of relative movement of the rotary frame using a photoreflector (photodetector).

That is, the conventional lens barrel includes a motor (zoom motor) which advances and retreats the rotary frame to/from a predetermined zoom position and a reduction gear train which, being linked to a gear fixed to an output shaft of the motor, reduces rotary driving of the motor.

Thus, some conventional lens barrels are designed to detect the amount of relative movement of the rotary frame by detecting RPM of the motor using a photoreflector (photodetector).

Normally, a lubricant such as grease is applied to the reduction gear train to reduce friction, to muffle sound, and so on.

However, the photoreflector (photodetector) tends to be susceptible to lubricants such as grease.

For example, grease may fly off the reduction gear train when the motor rotates. In such a case, if the grease flying off when the motor rotates attaches to the photoreflector or an impeller placed between a light-emitting unit and light-receiving unit of the photoreflector (photodetector), it may become difficult to detect the RPM of the motor, and thus the amount of relative movement of the rotary frame. If the amount of relative movement of the rotary frame cannot be detected, the zoom position cannot be found accurately as designed.

To deal with this, a reduction gear unit disclosed in Japanese Patent Application Laid-Open Publication No. 2004-191434 is configured such that an impeller and reduction gear train are housed in compartments isolated from each other to prevent grease from flying off the reduction gear train to the impeller or a photoreflector.

Regarding means to detect the amount of relative movement of the rotary frame, various means are available in addition to the above-described means which involves detecting the RPM of the motor (zoom motor). For example, it is conceivable to place a photoreflector (photodetector) in an opening provided in the rotary frame, emit light from a light-emitting unit of the photoreflector to the rotary frame, and receive light reflected from the rotary frame using a light-receiving unit of the photoreflector. Such a configuration can also detect the amount of relative movement of the rotary frame.

SUMMARY OF THE INVENTION

The present invention provides a lens barrel includes: a first member which has a first sliding-contact surface and an opening formed in the first sliding-contact surface; a second member which has a second sliding-contact surface and moves relative to the first member, the second sliding-contact surface being placed in sliding contact with the first sliding-contact surface; a photodetector provided in the opening of the first member, facing the second sliding-contact surface, to detect relative movement between the first member and the second member; and a lubricant sump portion which, being provided in the first member, has a lubricant sump space on opposite sides of the opening interposing the opening therebetween in a direction of the relative movement.

Advantages of the present invention will become more apparent from the detailed description given below.

DETAILED DESCRIPTION OF THE PREFERRED EMBODIMENTS

According to the present invention, an opening is formed in a sliding-contact surface of a fixed frame and a photoreflector (photodetector) is provided in the opening, facing a sliding-contact surface of a rotary frame, where the sliding-contact surface of the rotary frame is placed in sliding contact with the sliding-contact surface of the fixed frame. A stepped-plane is provided between the two sliding-contact surfaces near the photodetector to form a lubricant sump space so that even if grease (lubricant) applied to the sliding-contact surfaces are separated from the sliding-contact surfaces, the separated grease will collect in the lubricant sump space (the stepped-plane) without flowing into the opening where the photoreflector is located and thus does not collect on light-emitting and light-receiving surfaces of the photoreflector.

Preferred embodiments of the present invention will be described in detail below with reference to the drawings.

First Embodiment

Figure 1:
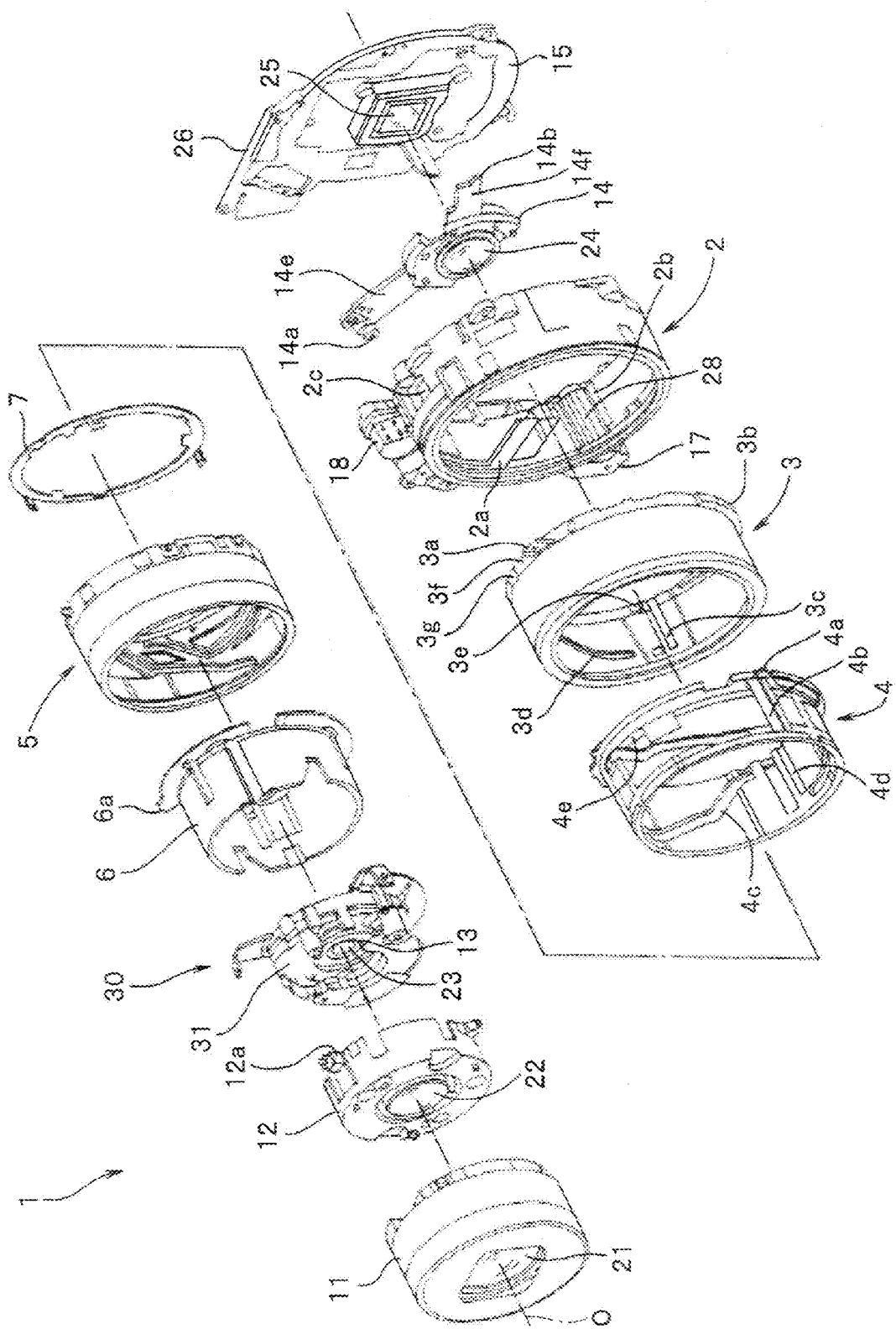
FIG. 1 is an exploded perspective view showing a lens barrel according to a first embodiment of the present invention.

FIG. 1 is an exploded perspective view showing a mobile-object detection apparatus incorporated in a zoom lens barrel according to a first embodiment of the present invention.

A schematic configuration of the mobile-object detection apparatus according to the present embodiment is as follows.

That is, the mobile-object detection apparatus according to the present embodiment is incorporated in a collapsible zoom lens barrel. The zoom lens barrel is configured to be alterable between non-shooting condition under which lens frames are housed in a camera body (collapsed state) and shooting condition under which the lens frames project toward a subject along an optical axis (photographic optical axis) to be ready for shooting. Under the non-shooting condition in which the zoom lens barrel is collapsed, total length of the zoom lens barrel becomes shorter than in the shooting condition. Under the shooting condition in which shooting is done, the zoom lens barrel can perform a zoom operation between short focus position and long focus position.

Incidentally, along the optical axis, the direction toward the subject is designated as a forward direction, which corresponds to an extension direction of frame members. On the other hand, the direction toward an image forming side is designated as a rearward direction, which corresponds to a retraction direction of the frame members.

As shown in FIG. 1, the zoom lens barrel 1 with the mobile-object detection apparatus incorporated includes a fixed frame 2, rotary frame 3, movable frame 4, cam frame 5, and rectilinear guide frame 6, starting from the rear (side of the image forming plane).

Now movements (rotation and movements along the optical axis O) of the frame members will be described. Being supported by the fixed frame 2, the rotary frame 3 can rotate with respect to the fixed frame 2 and advance and retreat along the optical axis O by being driven by a zoom motor which functions as a driving source during a zoom operation and collapse operation. On the other hand, the movable frame 4, which is placed in an inner circumferential part of the rotary frame 3 in such a way as to be able to rotate relative to the rotary frame 3, can move along the optical axis 0 with its rotation restricted by the fixed frame 2.

The cam frame 5, which is placed on an inner circumference of the movable frame 4, rotates together with the rotary frame 3, being supported by the rotary frame 3 in such a way as to be able to move relative to the rotary frame 3 along the optical axis O. Furthermore, the rectilinear guide frame 6 is joined to a cam frame 5 by means of a bayonet plate 7 fixed to a rear side of the cam frame 5. A guiding protrusion 6a of the rectilinear guide frame 6 is engaged with a rectilinear groove 4d of the movable frame 4. Consequently, the rectilinear guide frame 6 can move along the optical axis O with its rotation restricted.

Furthermore, the zoom lens barrel 1 includes a third-group unit 30, first-group frame 11, second-group frame 12, fourth-group frame 14, and holding plate 15.

The third-group unit 30 contains a shutter 31 and a third-group frame 13 which is a retraction lens frame. The third-group unit 30 can move along the optical axis O with its rotation restricted by the movable frame 4. The first-group frame 11 and second-group frame 12 advance and retreat along the optical axis O by the cam frame 5 with their rotation restricted by the rectilinear guide frame 6.

The first-group frame 11, second-group frame 12, third-group frame 13, and fourth-group frame 14 hold a first lens group 21, second lens group 22, third lens group 23, and fourth lens group 24, respectively, where the third lens group 23 serves as a retraction lens and fourth lens group 24 serves as a focusing lens. The lens groups 21, 22, 23, and 24 make up a photographic optical system.

Frame members such as the rotary frame 3, movable frame 4 are incorporated in the fixed frame 2 in a predetermined order. The holding plate 15 is fixed to a rear side (side of the image forming plane) of the fixed frame 2 in which the above-described frame members have been incorporated. Then, an image pickup unit 26 equipped with an image pickup device 25 and the like is mounted on a rear side of the holding plate 15.

Next, general configuration of individual components will be described.

The fixed frame 2, which is formed into a cylindrical shape, has a cam groove 2a in its inner circumference, where the cam groove 2a communicates an inclined cam groove inclined relative to the optical axis 0 with a circumferential groove formed in a circumferential direction, and the rectilinear groove 2b parallel to the optical axis O.

A zooming unit 17 and focusing unit 18 are disposed on an outer circumference of the fixed frame 2.

The zooming unit 17 includes a zoom motor which is a zoom drive source as well as a gear train, long gear 28, and the like which transmit driving force of the zoom motor. Being driven by the zoom motor, the zooming unit 17 functions as a zoom drive mechanism which moves a zooming optical system (the first lens group 21, second lens group 22, and third lens group 23) in the photographic optical system along the optical axis O as well as performing a collapse operation to move the zoom lens barrel 1 from the shooting condition to non-shooting condition (collapsed state).

On the other hand, the focusing unit 18 includes a focus motor which is a focus drive source as well as a gear train, guide shaft, and the like which transmit driving force of the focus motor. Being driven by the focus motor, the focusing unit 18 functions as a focus drive mechanism which moves a focusing optical system (the fourth lens group 24) in the photographic optical system along the optical axis O.

The long gear 28 is mounted in an exposed state on the inner circumference of the fixed frame 2, being parallel to the optical axis O. The guide shaft of the focusing unit is passed through a shaft hole 14*a* of fourth-group frame 14 (focusing lens frame), allowing the fourth-group frame 14 to move along the optical axis O.

The rotary frame 3, which is formed into a cylindrical shape, is inserted in the inner circumference of the fixed frame 2 in such a way as to be able to rotate with respect to the fixed frame 2 and move along the optical axis O. A cam follower 3*a* and gear 3*b* are formed on rear part of an outer circumference of the rotary frame 3. Also, a cam groove 3*d* for the third group and a rectilinear groove 3*c* for the cam frame are formed in an inner circumference of the rotary frame 3, where the cam groove 3*d* is inclined with respect to the optical axis O and the rectilinear groove 3*c* is parallel to the optical axis O. Besides, a protrusion 3*e* is formed, protruding inward, on a rear end of the inner circumference of the rotary frame 3.

The cam follower 3*a* of the rotary frame 3 is slidably fitted in the cam groove 2*a* of the fixed frame 2. On the other hand, the gear 3*b* of the rotary frame 3 is meshed with the long gear 28 of the fixed frame 2. Consequently, when the zoom motor of the zooming unit 17 operates, rotationally driving the long gear 28, the driving force thereof is transmitted to the rotary frame 3 via the gear 3*b* to rotate the rotary frame 3. When the rotary frame 3 rotates, the cam follower 3*a* of the rotary frame 3 moves along the inclined cam groove of the cam groove 2*a* in the fixed frame 2, and consequently, the rotary frame 3 is extended forward from collapsed position to short focus position and thus put into shooting condition. When the zoom lens barrel 1 is in the shooting condition, since the cam follower 3*a* moves along the circumferential groove of the cam groove 2*a*, the rotary frame 3 moves only in a direction of rotation without moving along the optical axis O. In this way, as the rotary frame 3 rotates, the lens frames perform a zoom operation by moving from short focus position to long focus position.

According to the present embodiment, focus is placed on relative moved position between two members. In this case, the two members are the fixed frame 2 and rotary frame 3. Thus, description of members other than the fixed frame 2 and rotary frame 3 will be omitted.

Figure 2:
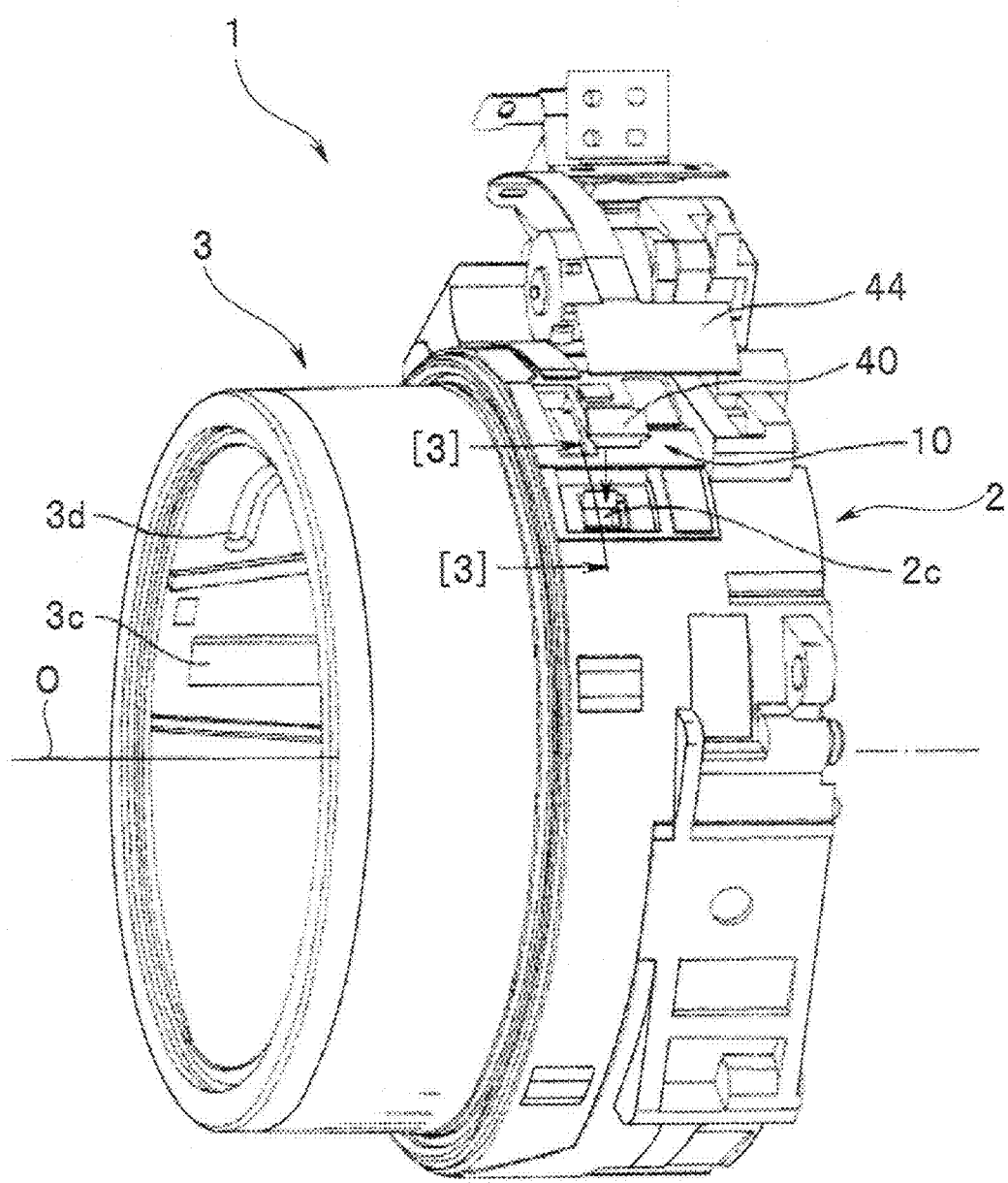
FIG. 2 is an enlarged perspective view of principal part showing a mobile-object detection apparatus in the lens barrel in FIG. 1.
Figure 3:
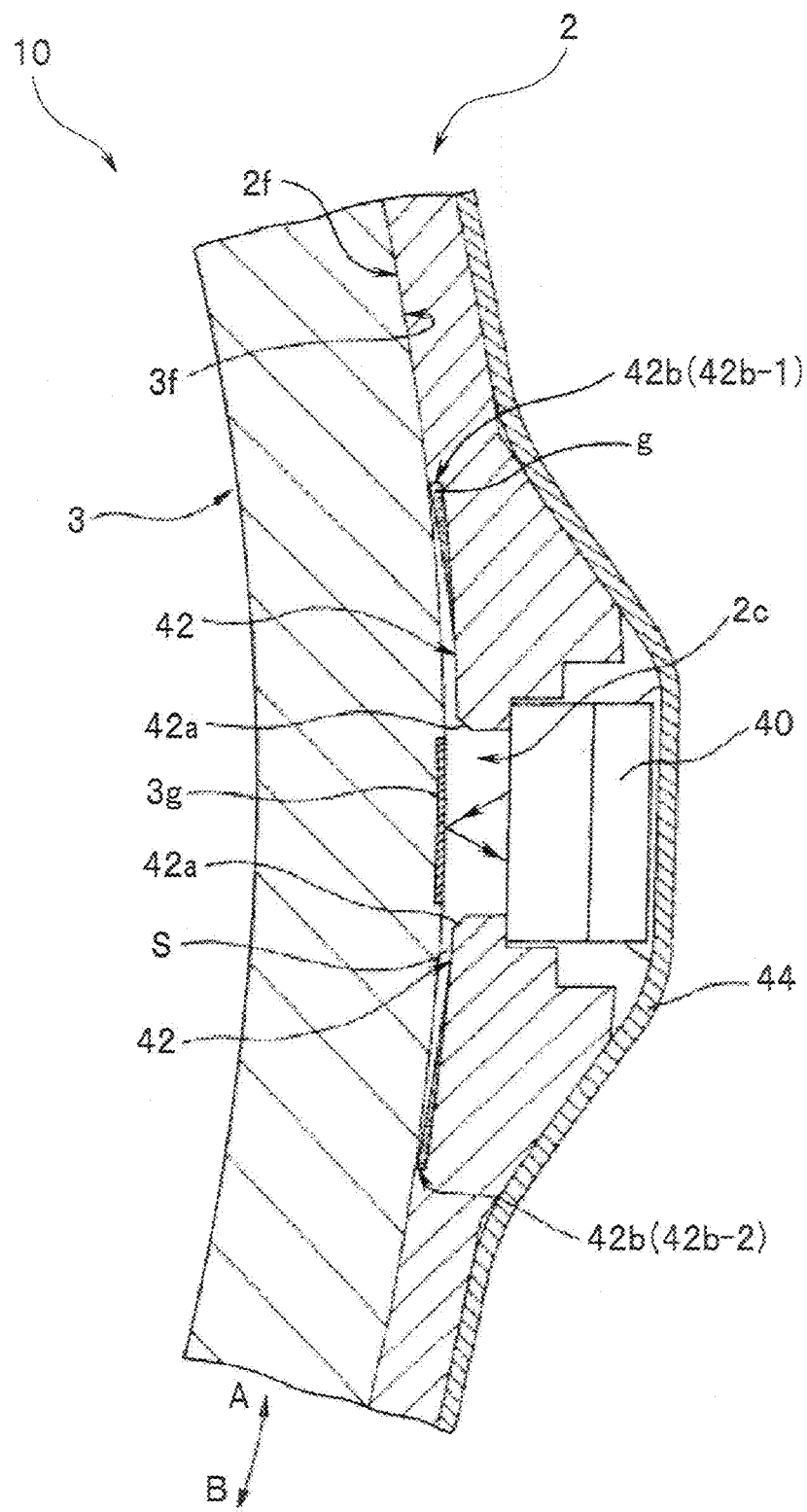
FIG. 3 is an enlarged sectional view of principal part taken along line [3]-[3] in FIG. 2.
Figure 4:
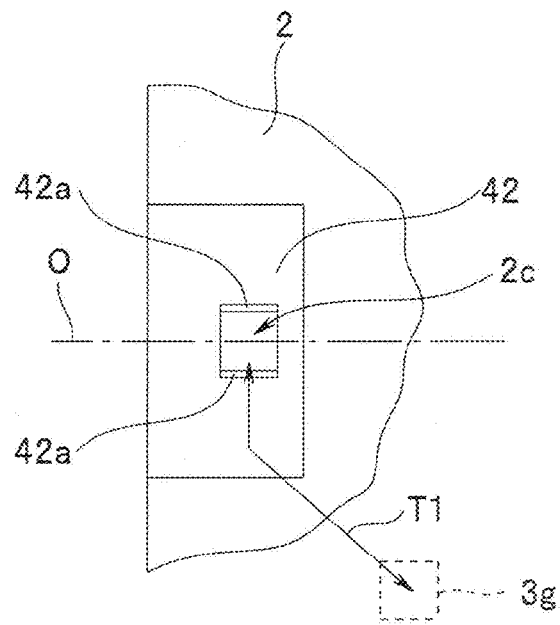
FIG. 4 is a diagram showing the vicinity of an opening in a fixed frame (first member) of the mobile-object detection apparatus in the lens barrel in FIG. 1.

FIG. 2 is an enlarged perspective view of principal part showing the mobile-object detection apparatus according to the present embodiment. FIG. 3 is an enlarged sectional view of principal part taken along line [3]-[3] in FIG. 2. FIG. 4 is a diagram showing the vicinity of an opening in the fixed frame (first member) of the mobile-object detection apparatus in FIG. 3 as viewed from the inner circumference of the fixed frame.

As described above, the rotary frame 3 is placed in the inner circumference of the fixed frame 2 in such a way as to be able to rotate with respect to the fixed frame 2 and move along the optical axis O. Thus, when the rotary frame 3 rotates in the fixed frame 2, the rotary frame 3 moves relative to the fixed frame 2. This makes it possible to detect movement of the rotary frame 3 relative to the fixed frame 2 (advance and retreat along the optical axis O) by detecting the rotation of the rotary frame 3.

As shown in FIG. 2, the mobile-object detection apparatus 10 includes the fixed frame (first member) 2, the rotary frame (second member) 3, and a photodetector 40 which detects the movement of the rotary frame 3 relative to the fixed frame 2.

The photodetector 40 is, for example, a photoreflector which includes a light-emitting unit and light-receiving unit. As shown in FIG. 3, an opening 2*c* is formed in the fixed frame 2, facing an outer circumferential surface of the rotary frame 3, and the light-emitting unit and light-receiving unit are provided in the opening 2*c* of the fixed frame 2, facing a sliding-contact surface 3*f* (second sliding-contact surface) on the outer circumferential surface of the rotary frame 3. A reflective label 3*g* is attached to the sliding-contact surface 3*f*, i.e., the outer circumferential surface on the rear end of the rotary frame 3. The reflective label 3*g* is located facing the photodetector 40 at a predetermined position, on the rotary frame 3 side.

As described above, the rotary frame 3 moves with respect to the fixed frame 2 along the optical axis O rotating in the fixed frame 2. At that time, the reflective label 3*g* located at a predetermined position of the rotary frame 3 draws a trajectory such as indicated by symbol T1 in FIG. 4.

That is, the reflective label 3*g* is placed in such a way as to face the photodetector 40 in the opening 2*c* of the fixed frame 2 when located in a predetermined part of the trajectory.

In FIGS. 2 and 3, reference numeral 44 denotes a flexible substrate which is connected to the zoom motor and on which the photodetector 40 is mounted.

To ensure smooth movement of the rotary frame 3 with respect to the fixed frame 2, lubricant such as grease g is applied between a sliding-contact surface 2*f* (first sliding-contact surface) of the fixed frame 2 and the sliding-contact surface 3*f* (second sliding-contact surface) of the rotary frame 3. As shown in FIG. 3, the mobile-object detection apparatus 10 further includes a stepped-plane 42 near the photodetector 40, between the sliding-contact surface 2*f* of the fixed frame 2 and sliding-contact surface 3*f* of the rotary frame 3 to form a vacant space S.

For example, the stepped-plane 42 is formed in the shape of a band on circumferentially opposite sides of the opening 2*c* of the fixed frame 2 interposing the opening 2*c* in which the photodetector 40 is provided, stretching circumferentially along the sliding-contact surface 2*f* of the fixed frame 2 (see FIG. 4). Corners 42*a* of the stepped-plane 42 communicating to the opening 2*c* are, for example, chamfered (see FIGS. 3 and 4).

When the rotary frame 3 rotates in a direction of arrow A or B in FIG. 3 with respect to the fixed frame 2, the grease g (lubricant) between the sliding-contact surface 2*f* of the fixed frame 2 and sliding-contact surface 3*f* of the rotary frame 3 is separated from the sliding-contact surfaces 2*f* and 3*f* by coming into contact with corners 42*b* in the inner part of the stepped-plane 42. However, the grease g separated from the sliding-contact surfaces 2*f* and 3*f* is designed to be collected in the stepped-plane 42 without flowing into the opening 2*c*.

That is, when the rotary frame 3 rotates in the direction of arrow A in FIG. 3, even if the grease g between the sliding-contact surfaces 2*f* and 3*f* is separated from the sliding-contact surfaces 2*f* and 3*f* by coming into contact with a corner 42*b*-1 in the inner part of the stepped-plane 42, the separated grease g is designed to be collected in the vacant space S formed by one side of the stepped-plane 42 without flowing into the opening 2c.

Also, when the rotary frame 3 rotates in the direction of arrow B in FIG. 3, even if the grease g between the sliding-contact surfaces 2f and 3f is separated from the sliding-contact surfaces 2f and 3f by coming into contact with a corner 42b-2 in the inner part of the stepped-plane 42, the separated grease g is designed to be collected in the vacant space S formed by the other side of the stepped-plane 42 without flowing into the opening 2c.

That is, when the rotary frame 3 rotates in a direction of arrow A or B and the grease g is separated from the sliding-contact surfaces 2f and 3f by coming into contact with the corners 42b in the inner part of the stepped-plane 42, the separated grease g is collected in the vacant space S sequentially beginning with the inner part of the stepped-plane 42. In this case, the stepped-plane 42 functions as lubricant sump means which is a lubricant sump portion forming a lubricant sump space.

Incidentally, even if grease g is partially thickly applied to the sliding-contact surface 3f, since the corners 42a of the stepped-plane 42 are chamfered, the grease g will not come into contact with the corners 42a of the stepped-plane 42. This makes it possible to prevent the grease g from separating from the sliding-contact surface 3f of the rotary frame 3.

Also, since the chamfered space of the corners 42a of the stepped-plane 42 functions as the ultimate sump space of the lubricant sump space, the grease g separated from the sliding-contact surfaces 2f and 3f cannot flow into the opening 2c unless the grease g overflows the chamfered space on the corners.

In this way, the grease g separated from the sliding-contact surfaces 2f and 3f collects in the stepped-plane 42, which functions as lubricant sump means which forms the lubricant sump space, without flowing into the opening 2c. Therefore, the grease g does not reach the light-emitting and light-receiving surfaces of the photodetector 40. Since the grease g separated from the sliding-contact surfaces 2f and 3f does not collect on the light-emitting and light-receiving surfaces of the photodetector 40, an optical path of the photodetector 40 is not blocked by the grease g.

That is, light emitted from the light-emitting unit of the photodetector 40 reaches the reflective label 3g on the sliding-contact surface 3f of the rotary frame 3 without being obstructed by the grease g. Then, after being reflected by the reflective label 3g, the light is received by the light-receiving unit of the photodetector 40. Consequently, moved position of the rotary frame 3, i.e., the moved position of the rotary frame 3 relative to the fixed frame 2 can always be detected reliably by the photodetector 40, making it possible to extend the rotary frame 3 accurately to a predetermined zoom position.

Also, since the lubricant sump space can be provided by simply forming the vacant space S by providing the stepped-plane 42, it is possible to eliminate the effect of the grease g on the photodetector 40 using a simple configuration.

Furthermore, since the lubricant sump space is formed in the shape of a band, the grease g collects in a location sufficiently isolated circumferentially from the photodetector 40. Consequently, the grease g will not reach the opening 2c where the photodetector 40 is located. This reliably prevents the grease g from accumulating on the light-emitting and light-receiving surfaces of the photodetector 40.

Second Embodiment

Figure 6:
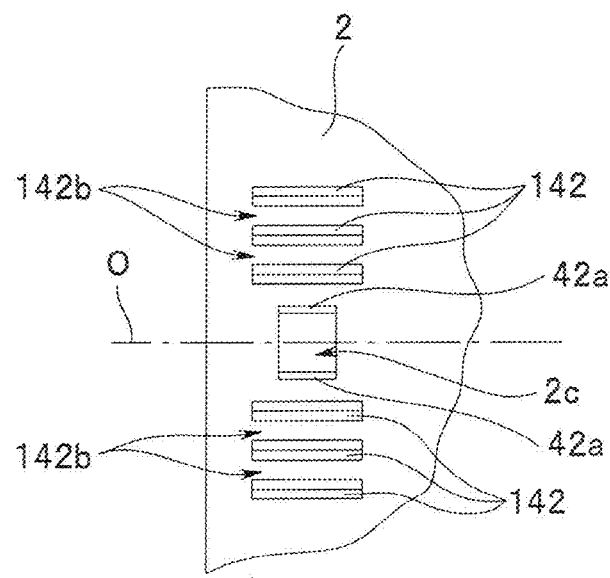
FIG. 6 is a diagram showing the vicinity of an opening in a first member of the mobile-object detection apparatus in the lens barrel in FIG. 5.
Figure 5:
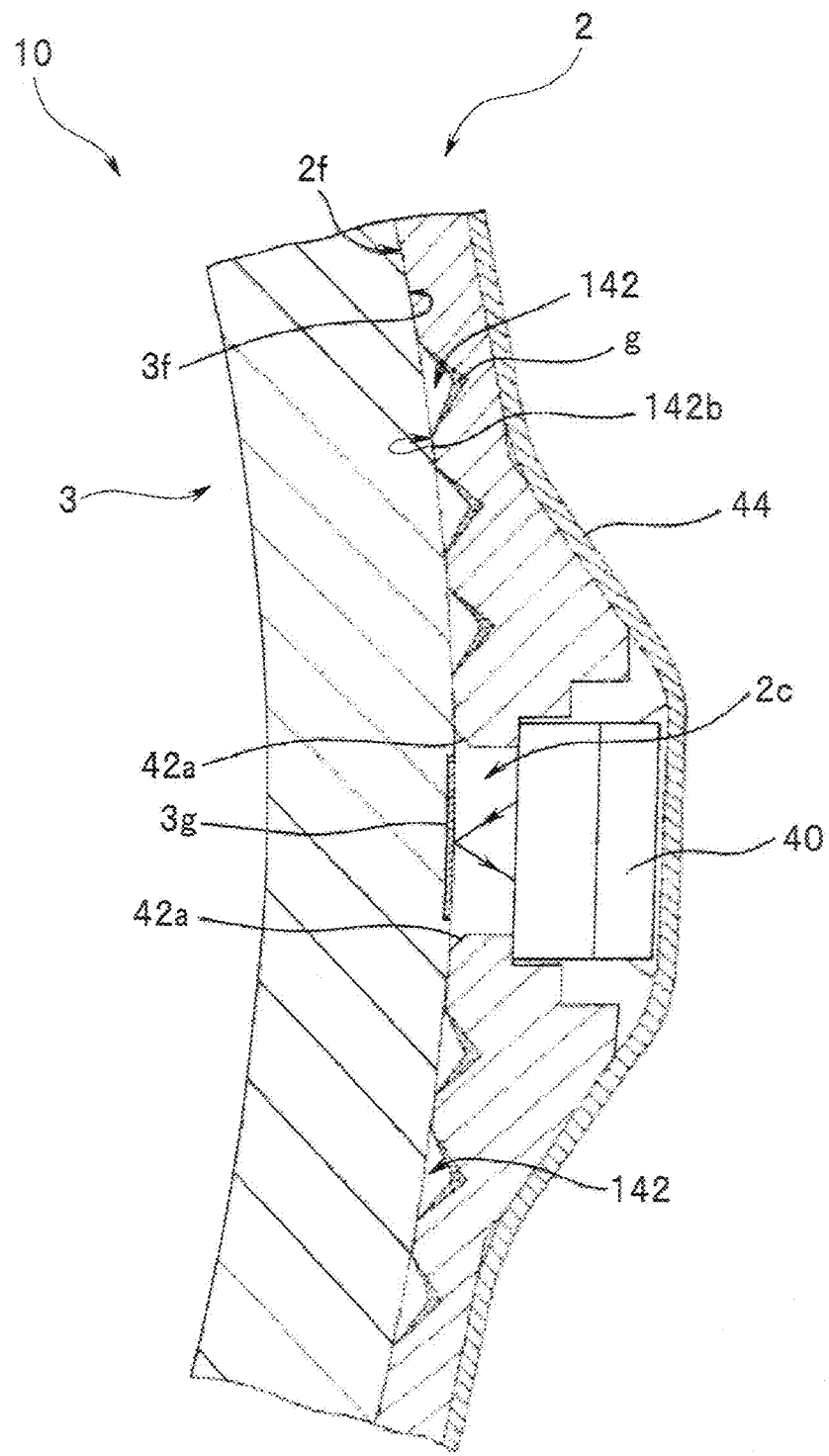
FIG. 5 is an enlarged sectional view of principal part showing a mobile-object detection apparatus in a lens barrel according to a second embodiment of the present invention.

A mobile-object detection apparatus according to a second embodiment of the present invention is shown in FIGS. 5 and 6. FIGS. 5 and 6 correspond, respectively, to FIGS. 3 and 4 according to the first embodiment. In the present embodiment, components with the same functions as those of the first embodiment will be denoted by the same reference numerals as the corresponding components in the first embodiment, and description thereof will be omitted, mainly describing differences from the first embodiment.

The second embodiment shown in FIGS. 5 and 6 differs from the first embodiment shown in FIGS. 1 to 4 in that whereas the lubricant sump means according to the first embodiment is made up of a stepped-plane, the lubricant sump means according to the second embodiment is made up of plural recessed grooves, i.e., groove-like recesses, extending in the moving direction of the rotary frame 3 (direction of the optical axis O). The rest of the configuration is the same as that of the first embodiment.

As shown in FIGS. 5 and 6, according to the second embodiment, plural recessed grooves 142 with a triangular cross section are formed, as the lubricant sump means, in the sliding-contact surface 2f of the fixed frame 2. Three recessed grooves 142 each, for example, are arranged circumferentially at predetermined intervals on circumferentially opposite sides of the opening 2c in the fixed frame 2 interposing the opening 2c in such a way that all the recessed grooves 142 will be parallel to each other. The individual recessed grooves 142 are configured to extend linearly in a direction orthogonal to the circumferential direction, i.e., in an advance/retreat direction of the rotary frame 3 (direction of the optical axis O).

By providing the recessed grooves 142 configured as described above, even if the grease g between the sliding-contact surfaces 2f and 3f is separated from the sliding-contact surfaces 2f and 3f by coming into contact with a sliding-contact surface 142b between adjacent recessed grooves 142 along with rotation of the rotary frame 3, the separated grease g collects in bottoms of the recessed grooves 142 without reaching the opening 2c. This makes it possible to prevent the grease g from flowing into the opening 2c.

Thus, as in the case of the first embodiment, the present embodiment makes it possible to prevent the grease g separated from the sliding-contact surfaces 2f and 3f from collecting on the light-emitting and light-receiving surfaces of the photodetector 40, and thereby prevent the grease g from blocking the optical path of the photodetector 40. Consequently, the moved position of the rotary frame 3 relative to the fixed frame 2 can be detected accurately by the photodetector 40.

Also, since the plural recessed grooves (lubricant sump means) 142 are provided to serve as a barrier against the grease g approaching the light-emitting and light-receiving surfaces of the photodetector 40, it is possible to reliably prevent the grease g from accumulating on the light-emitting and light-receiving surfaces of the photodetector 40.

Third Embodiment

Figure 7:
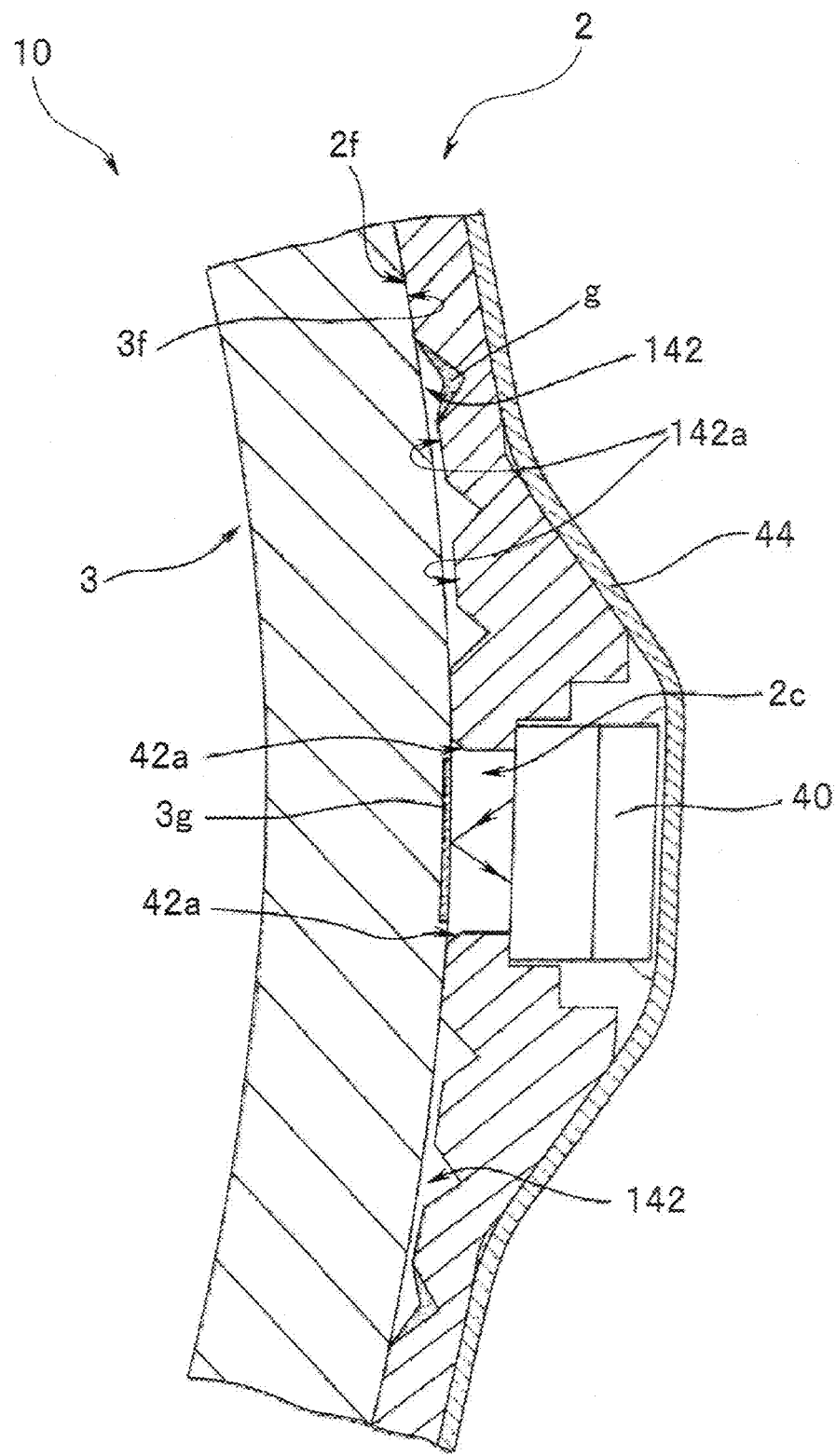
FIG. 7 is an enlarged sectional view of principal part showing a mobile-object detection apparatus in a lens barrel according to a third embodiment of the present invention.
Figure 8:
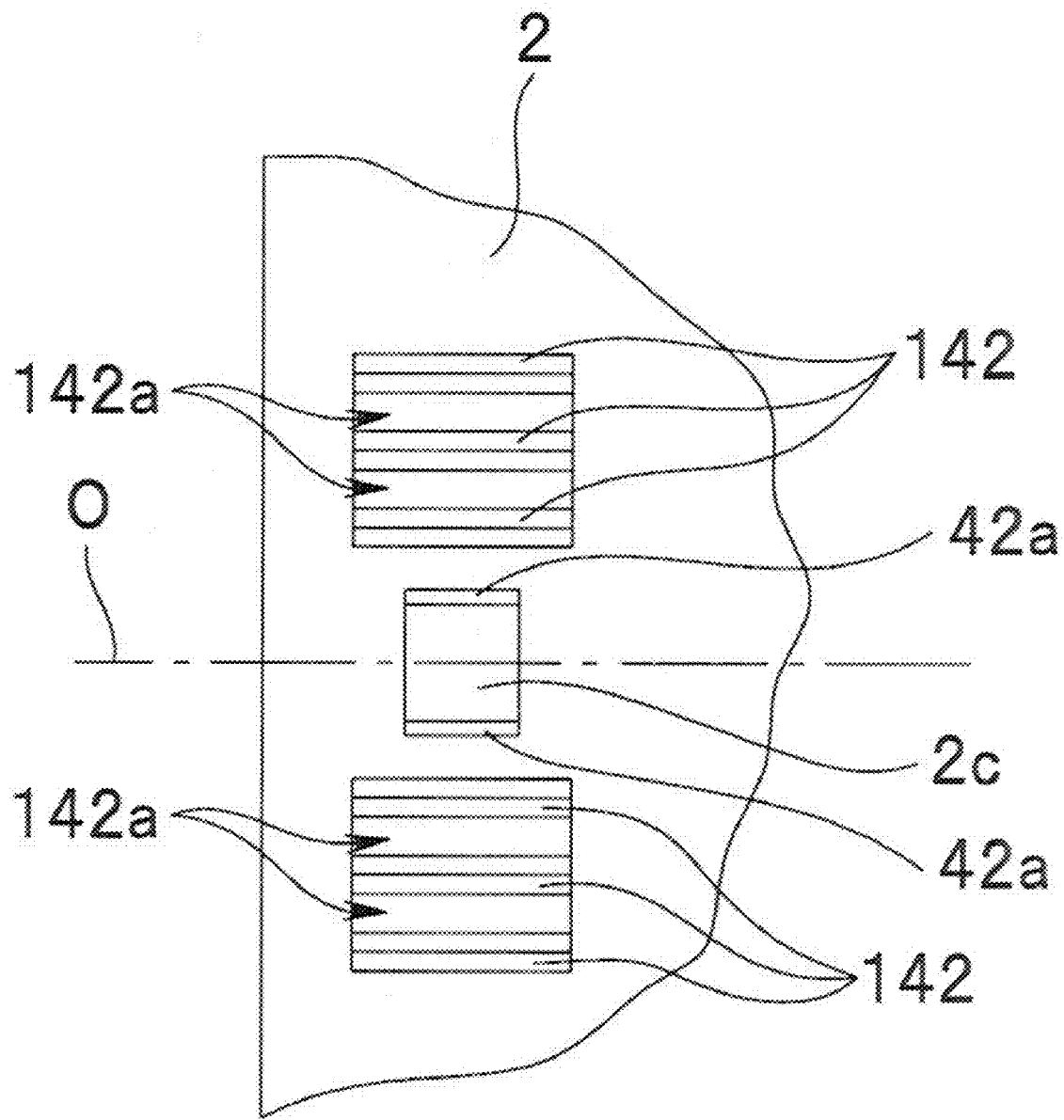
FIG. 8 is a diagram showing the vicinity of an opening in a first member of the mobile-object detection apparatus in the lens barrel in FIG. 7.

A third embodiment of the present invention is shown in FIGS. 7 and 8. According to the third embodiment, three recessed grooves 142 are formed in a stepped-plane 142a of the fixed frame 2, the stepped-plane being spaced from the sliding-contact surface 3f of the rotary frame 3. The recessed grooves 142 are communicated with each other through a vacant space formed between the stepped-plane 142a and the sliding-contact surface 3f of the rotary frame 3.

In this way, when the plural recessed grooves 142 are formed being coupled with each other by being provided in the stepped-plane 142a, it is possible to secure a larger lubricant sump space, and thereby more reliably prevent the grease g from flowing into the opening 2c. Therefore, it is possible to more reliably prevent the grease g from accumulating on the light-emitting and light-receiving surfaces of the photodetector 40.

Fourth Embodiment

Figure 9:
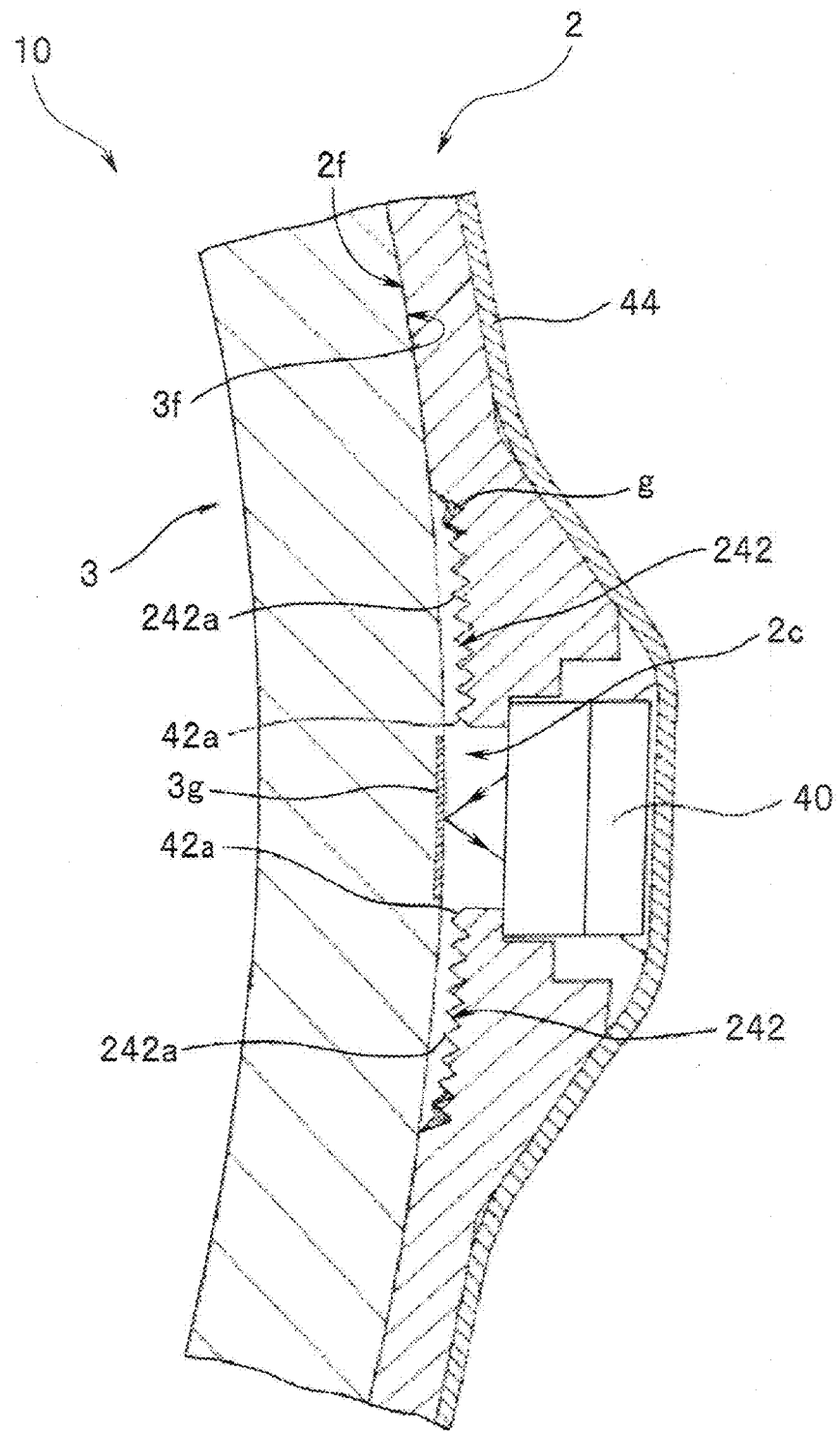
FIG. 9 is an enlarged sectional view of principal part showing a mobile-object detection apparatus in a lens barrel according to a fourth embodiment of the present invention.
Figure 10:
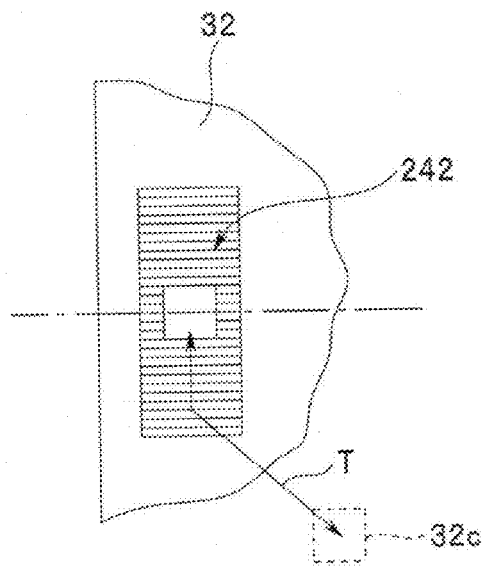
FIG. 10 is a diagram showing the vicinity of an opening in a first member of the mobile-object detection apparatus in the lens barrel in FIG. 9.

A mobile-object detection apparatus according to a fourth embodiment of the present invention is shown in FIGS. 9 and 10. Again, components with the same functions as those of the first embodiment will be denoted by the same reference numerals as the corresponding components in the first embodiment, and description thereof will be omitted, mainly describing differences from the first embodiment.

The fourth embodiment shown in FIGS. 9 and 10 differs from the first embodiment shown in FIGS. 1 to 4 in that whereas the lubricant sump means according to the first embodiment is made up of only a stepped-plane, the lubricant sump means according to the fourth embodiment is made up of a combination of plural recessed grooves formed successively and a stepped-plane. The rest of the configuration is the same as that of the first embodiment.

As shown in FIG. 9, according to the fourth embodiment, plural recessed grooves 242 with a triangular cross section are cut, as the lubricant sump means, in the sliding-contact surface 2f of the fixed frame 2. The plural recessed grooves 242 are placed circumferentially on circumferentially opposite sides of the opening 2c in the fixed frame 2 interposing the opening 2c, being arranged successively and with no gap therebetween. The individual recessed grooves 242 are formed to extend linearly in a direction orthogonal to the circumferential direction, i.e., in the direction along the optical axis O. The cross-section of the individual recessed grooves 242 form plural triangular ridges 242a. The triangular ridges 242a are formed on the inner circumferential surface of the fixed frame 2 with some clearance from the sliding-contact surface 3f of the rotary frame 3.

With the configuration according to the present embodiment in which the recessed grooves 242 communicated with each other are arranged, as lubricant sump means, on circumferentially opposite sides of the opening 2c, the grease g between the sliding-contact surfaces 2f and 3f collects in the recessed grooves 242 when separated from the sliding-contact surfaces 2f and 3f. At this time, the plural recessed grooves 242 formed near the opening 2c prevent the separated grease g from flowing into the opening 2c. Thus, again with the configuration according to the present embodiment, it is possible to reliably prevent the grease g from accumulating on the light-emitting and light-receiving surfaces of the photodetector 40.

Also, the plural recessed grooves 242, which are arranged side by side successively, are communicated with each other, securing a larger lubricant sump space between the recessed grooves 242 and the sliding-contact surface 3f of the rotary frame 3. This makes it possible to more effectively eliminate the effect of the grease g on the photodetector 40 using a simple configuration.

Since the grease g is accumulated at a location along the circumference sufficiently away from the opening 2c, i.e., from the photodetector 40, this configuration makes it possible to reliably prevent the grease g from accumulating on the light-emitting and light-receiving surfaces of the photodetector 40.

Fifth Embodiment

Figure 11:
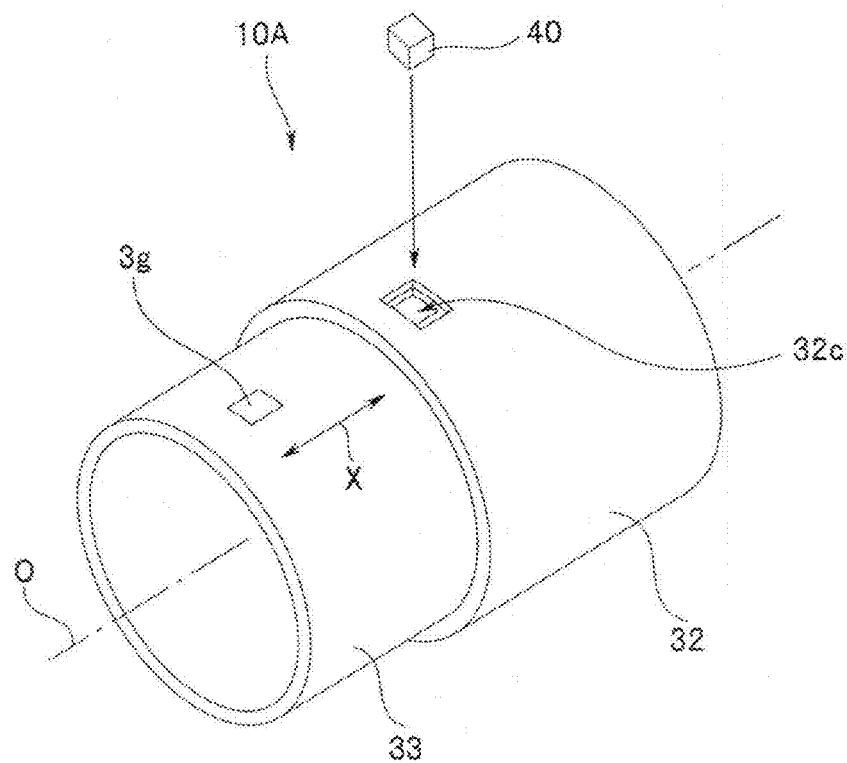
FIG. 11 is an enlarged perspective view of principal part showing a mobile-object detection apparatus in a lens barrel according to a fifth embodiment of the present invention.
Figure 12:
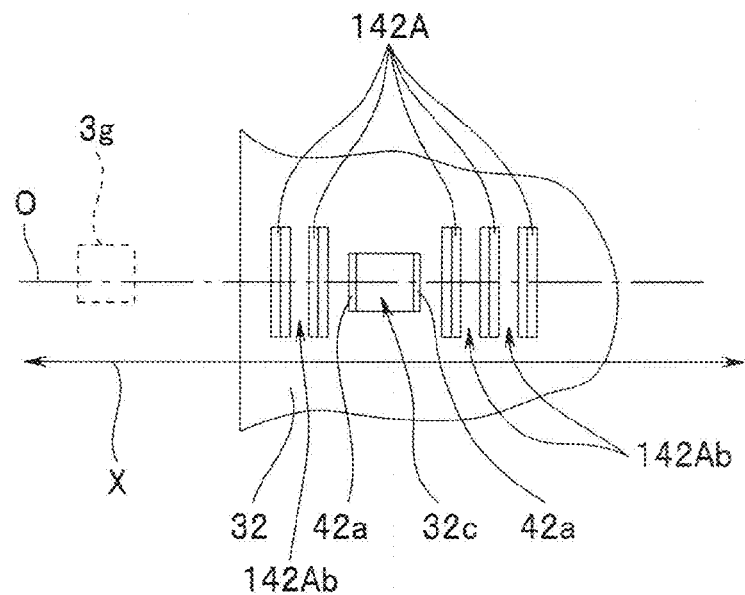
FIG. 12 is a diagram showing the vicinity of an opening in a first member of the mobile-object detection apparatus in the lens barrel in FIG. 11.

A mobile-object detection apparatus according to a fifth embodiment of the present invention is shown in FIGS. 11 and 12. Again, components with the same functions as those of the embodiments described above will be denoted by the same reference numerals as the corresponding components in the embodiments described above, and description thereof will be omitted, mainly describing differences from the embodiments described above.

As shown in FIG. 11, the mobile-object detection apparatus 10A according to the present embodiment includes a first member 32, second member 33, and photodetector 40. The mobile-object detection apparatus 10A according to the present embodiment is configured in a manner substantially similar to the second embodiment and differs from the second embodiment in moving directions of two members which move relative to each other.

Specifically, the first member 32 is, for example, a fixed frame of a zoom lens barrel and the second member 33 is, for example, a rectilinear frame of the zoom lens barrel. The second member 33 is placed inside the first member 32 in such a way as to advance and retreat with respect to the first member 32 in directions along the optical axis O (directions indicated by arrow X in FIGS. 11 and 12).

Also, a photoreflector, for example, is used as the photodetector 40 to detect moved position of the second member 33 relative to the first member 32 in the directions along the optical axis O. The photodetector 40 is placed in an opening 32c formed in the first member 32, with light-emitting and light-receiving surfaces of the photodetector 40 facing a sliding-contact surface 33f, i.e., an outer circumferential surface of the second member 33.

On the other hand, a reflective label 3g is attached to the sliding-contact surface, i.e., the outer circumferential surface of the second member 33. The reflective label 3g is provided in such a way as to face the photodetector 40 on the first member 32 at a predetermined position.

Besides, according to the present embodiment, plural recessed grooves 142A with a triangular cross section are formed, as lubricant sump means, on a sliding-contact surface, i.e., an inner circumferential surface of the first member 32. The plural recessed grooves 142A are arranged on opposite sides of an opening 2c interposing the opening 2c in the first member 32 along the optical axis O as shown in FIG. 12. Also, the recessed grooves 142A are arranged in parallel to each other at predetermined intervals in the directions along the optical axis O. The individual recessed grooves 142A are formed as grooves extending linearly in a direction orthogonal to the direction of the optical axis O. Also, a sliding-contact surface 142Ab is formed between adjacent recessed grooves 142A.

By providing the recessed grooves 142A configured as described above, even if the grease g applied between the sliding-contact surfaces of the first member 32 and second member 33 is separated from the sliding-contact surfaces by coming into contact with the sliding-contact surface 142Ab between adjacent recessed grooves 142A along with advancing and retreating movement of the second member 33, the separated grease g collects in bottoms of the recessed grooves 142A without reaching the opening 2c. This makes it possible to prevent the grease g from flowing into the opening 2c.

Thus, again the present embodiment makes it possible to prevent the grease g separated from the sliding-contact surfaces of the two members from collecting on the light-emitting and light-receiving surfaces of the photodetector 40, and thereby prevent the grease g from blocking the optical path of the photodetector 40. Consequently, the moved position of the second member 33 relative to the first member 32 can be detected accurately by the photodetector 40.

Incidentally, although it is assumed that the configuration of the present embodiment is basically similar to that of the second embodiment, this is not restrictive and the configuration of the third or fourth embodiment may be applied to the present embodiment.

Sixth Embodiment

Figure 13:
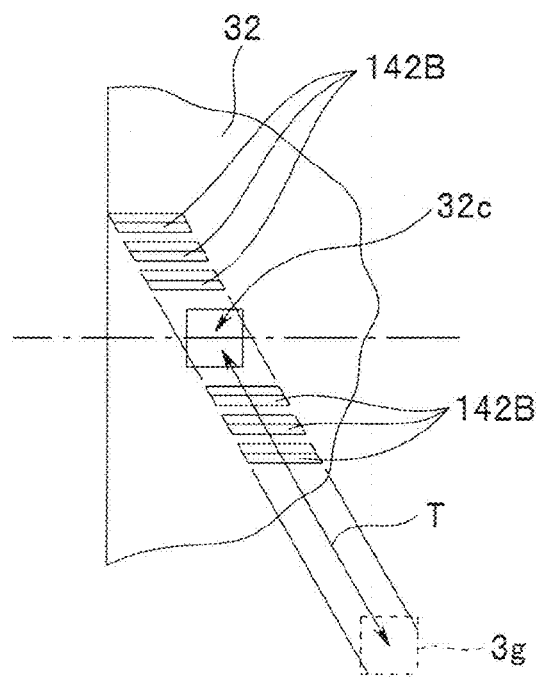
FIG. 13 is a diagram showing the vicinity of an opening in a first member of a mobile-object detection apparatus in a lens barrel according to a sixth embodiment of the present invention.

A mobile-object detection apparatus according to a sixth embodiment of the present invention is shown in FIG. 13. Again, components with the same functions as those of the embodiments described above will be denoted by the same reference numerals as the corresponding components in the embodiments described above, and description thereof will be omitted, mainly describing differences from the embodiments described above.

The mobile-object detection apparatus according to the present embodiment is similar to the embodiments described above in that the mobile-object detection apparatus includes a first member 32, second member 33, and photodetector.

In the mobile-object detection apparatus according to the present embodiment, the second member 33 (e.g., a rotary frame; not shown) moves in the directions along the optical axis O with respect to the first member 32 (e.g., a fixed frame) by rotating in the first member 32. That is, relative movement between the first member 32 and second member 33 is a spiral movement.

In this case, it is assumed that a reflective label 3g attached to an outer circumferential surface of the second member 33 draws a trajectory as indicated by symbol T in FIG. 13.

In this way, when two members—the first member and second member—move relative to each other, plural recessed grooves 142B serving as lubricant sump means are formed on the sliding-contact surface, i.e., the inner circumferential surface of the first member 32, so as to be arranged side by side on opposite sides of an opening 32c interposing the opening 32c along the trajectory T of the reflective label 3g.

This configuration allows the present invention to be applied to a mobile object in which the reflective label 3g attached to a predetermined location of the second member follows a spiral trajectory T inclined with respect to the optical axis O. Consequently, the configuration offers the same advantages as the embodiments described above.

As described above, according to the embodiments of the present invention, since a lubricant sump space serving as lubricant sump means is provided between the first sliding-contact surface and second sliding-contact surface (e.g., the sliding-contact surfaces of the first member and second member) near the photodetector, even if the lubricant and the like applied between the first member and second member is separated along with relative movement of the first member and second member, the separated lubricant and the like collect in the lubricant sump space before reaching the light-emitting and light-receiving surfaces of the photodetector and thus do not collect on the light-emitting and light-receiving surfaces of the photodetector.

Consequently, the lubricant does not obstruct detecting relative moved position of the second member performed by the photodetector, and thus the relative moved position between two members which move relative to each other can be detected accurately. Thus, for example, in a zoom lens barrel, the rotary frame 3 which is a second member can be moved accurately to a desired zoom position.

Although in the above example, the reflective label according to the present invention is attached to one location, the reflective label may be provided at multiple locations or reflector plates may be provided in such a way as to produce pulsed reflections. Then, an amount of relative movement or relative moved position between the two members can be detected using a pulsed signal outputted from the photoreflector.

The foregoing embodiments have been described by way of example to illustrate the present invention, and it goes without saying that various other forms are possible.

For example, in the embodiments described above, the recessed grooves 142 (FIGS. 5 and 7) and 242 (FIG. 9) have triangular cross sections, which, however, are only exemplary and are not restrictive. For example, the recessed grooves may have a rectangular or other cross-sectional shape.

Also, although detection of relative moved position between two members which move relative to each other has been described by taking as an example of detection of the relative moved position of the fixed frame 2 and rotary frame 3, the two members (first member and second member) targeted by the present invention are not limited to the fixed frame 2 and rotary frame 3. For example, the present invention is also applicable to detection of the relative moved position between two appropriate frame members among the third-group unit 30, first-group frame 11, second-group frame 12, fourth-group frame 14, and the like which move along the optical axis in the rotary frame 3.

When frame members rotate by means of a meshed helicoid screw, it is possible to prevent galling and the like by making lubricant sump means such as a stepped-plane smaller in size than the helicoid screw.

Furthermore, although detection of relative moved position between components of a zoom lens barrel has been described in the above embodiments, the two members to be detected are not limited to components of a zoom lens barrel, and any two members that move relative to each other may be the first member and the second member according to the present invention.

The present invention is widely applicable as a mobile-object detection apparatus which detects the amount of relative movement or relative moved position between two members which move relative to each other.

It is apparent that widely different embodiments of the present invention can be made without departing from the spirit and scope thereof. The present invention is not limited to the specific embodiments thereof except as defined in the appended claims.

What is claimed is:

1. A lens barrel comprising:
    a first member which has a first sliding-contact surface and an opening formed in the first sliding-contact surface;
    a second member which has a second sliding-contact surface and moves relative to the first member, the second sliding-contact surface being placed in sliding contact with the first sliding-contact surface;
    a photodetector provided in the opening of the first member, facing the second sliding-contact surface, to detect relative movement between the first member and the second member; and
    a lubricant sump portion which, being provided in the first member, has a lubricant sump space on opposite sides of the opening interposing the opening therebetween in a direction of the relative movement.

2. The lens barrel according to claim 1, wherein the first member and the second member are rotary members.

3. The lens barrel according to claim 1, wherein the lubricant sump portion is continuous with the opening.

4. The lens barrel according to claim 1, wherein the relative movement between the first member and the second member is a spiral movement.

5. The lens barrel according to claim 1, wherein the lubricant sump space is a concave recess provided in the first sliding-contact surface.

6. The lens barrel according to claim 5, wherein a plurality of recesses are arranged in the direction of the relative movement on the first sliding-contact surface.

7. The lens barrel according to claim 1, wherein the lubricant sump space includes a stepped-plane formed at a location opposite to and spaced from the second sliding-contact surface.

8. The lens barrel according to claim 7, wherein the lubricant sump space further has a concave recess in the stepped-plane.

9. The lens barrel according to claim 8, wherein a plurality of recesses are arranged in the direction of the relative movement in the stepped-plane.

10. The lens barrel according to claim 1, wherein the photodetector detects relative moved position between the first member and the second member.

11. The lens barrel according to claim 1, wherein the photodetector detects an amount of relative movement between the first member and the second member.

12. A lens barrel comprising:
  a first member which has a first sliding-contact surface and an opening formed in the first sliding-contact surface;
  a second member which has a second sliding-contact surface and moves relative to the first member, the second sliding-contact surface being placed in sliding contact with the first sliding-contact surface;
  a photodetector provided in the opening of the first member, facing the second sliding-contact surface, to detect relative movement between the first member and the second member; and
  a lubricant sump means which, being provided in the first member, has a lubricant sump space on opposite sides of the opening interposing the opening therebetween in a direction of the relative movement.

13. The lens barrel according to claim 12, wherein the first member and the second member are rotary members.

14. The lens barrel according to claim 12, wherein the lubricant sump means is continuous with the opening.

15. The lens barrel according to claim 12, wherein the relative movement between the first member and the second member is a spiral movement.

16. The lens barrel according to claim 12, wherein the lubricant sump space is a concave recess provided in the first sliding-contact surface.

17. The lens barrel according to claim 16, wherein a plurality of recesses are arranged in the direction of the relative movement on the first sliding-contact surface.

18. The lens barrel according to claim 12, wherein the lubricant sump space includes a stepped-plane formed at a location opposite to and spaced from the second sliding-contact surface.

19. The lens barrel according to claim 18, wherein the lubricant sump space further has a concave recess in the stepped-plane.

20. The lens barrel according to claim 19, wherein a plurality of recesses are arranged in the direction of the relative movement in the stepped-plane.

21. The lens barrel according to claim 12, wherein the photodetector detects relative moved position between the first member and the second member.

22. The lens barrel according to claim 12, wherein the photodetector detects an amount of relative movement between the first member and the second member.

* * * * *